United States Patent
Bai et al.

(10) Patent No.: US 8,206,857 B2
(45) Date of Patent: Jun. 26, 2012

(54) FUEL CELL COMBINED HEAT AND POWER GENERATION

(75) Inventors: Dingrong Bai, Dorval (CA); Jean-Guy Chouinard, Ville St-Laurent (CA); David Elkaïm, Ville St-Laurent (CA)

(73) Assignee: Hyteon Inc., Laval, Quebec (CA)

( * ) Notice: Subject to any disclaimer, the term of this patent is extended or adjusted under 35 U.S.C. 154(b) by 311 days.

(21) Appl. No.: 11/819,205

(22) Filed: Jun. 26, 2007

(65) Prior Publication Data
US 2009/0004516 A1    Jan. 1, 2009

(51) Int. Cl.
*H01M 8/18* (2006.01)
(52) U.S. Cl. .................... 429/417; 429/419
(58) Field of Classification Search ............ 429/12–46
See application file for complete search history.

(56) References Cited

U.S. PATENT DOCUMENTS

| | | | |
|---|---|---|---|
| 3,825,445 A * | 7/1974 | MacCarthy | 429/15 |
| 5,335,628 A | 8/1994 | Dunbar | |
| 5,419,284 A * | 5/1995 | Kobayashi et al. | 122/7 B |
| 6,290,142 B1 | 9/2001 | Togawa et al. | |
| 6,420,060 B1 | 7/2002 | Yamamoto et al. | |
| 6,861,169 B2 | 3/2005 | Hagan et al. | |
| 6,992,460 B1 | 1/2006 | Arikara et al. | |
| 2002/0018246 A1 | 2/2002 | Misawa | |
| 2002/0146605 A1 | 10/2002 | Nakanishi et al. | |
| 2003/0008184 A1 * | 1/2003 | Ballantine et al. | 429/13 |
| 2003/0064264 A1 | 4/2003 | Keegan et al. | |
| 2006/0068250 A1 * | 3/2006 | Bai et al. | 429/26 |

FOREIGN PATENT DOCUMENTS

| | | |
|---|---|---|
| JP | 2002-042840 | 2/2002 |
| JP | 2002-289212 | 10/2002 |
| JP | 2003-217603 | 7/2003 |
| JP | 2002-280031 | 9/2003 |

* cited by examiner

*Primary Examiner* — Melvin C Mayes
*Assistant Examiner* — Bijay Saha
(74) *Attorney, Agent, or Firm* — Norton Rose Canada LLP (57) ABSTRACT

A cogeneration system having flexible and controllable cogeneration loops. There is a first cogeneration loop to recover heat from a fuel cell power module, thereby producing a heat to electricity ratio between 0 and approximately 1.0. There is a second cogeneration loop to produce supplemental thermal energy for hot water generation and/or space heating. This loop can be connected or disconnected via switching valves depending on the thermal demands of hot water and/or space heating. This loop can also be useful to control the fuel processor temperature to prevent it from being overheated in cases when the fuel cell has low fuel utilization efficiency. With this second loop, it becomes possible to adjust the heat to electricity ratio at any desirable levels such as more than 2. It is also possible to produce the hot water at a higher temperature or superheated steam, which would have been difficult if only the first loop is used.

7 Claims, 7 Drawing Sheets

FUEL CELL COMBINED HEAT AND POWER GENERATION

CROSS-REFERENCE TO RELATED APPLICATIONS

This is the first application filed for the present invention.

FIELD OF THE INVENTION

The present invention relates to methods and apparatus for the cogeneration of power and heat from a fuel cell system. More particularly, the invention relates to the use of a fuel cell stack and an associated fuel processor assembly to provide both electricity and heating for a particular site, such as a building or a group of buildings, with adjustable and desirable heat to electricity ratio.

BACKGROUND OF THE INVENTION

Fueled by electric industry deregulation, environmental concerns, unease over energy security, and a host of other factors, interest in combined heat and power (CHP), or sometimes termed as cogeneration technologies, has been growing among energy customers, regulators, legislators, and developers. CHP is a specific form of distributed generation (DG), which refers to the strategic placement of electric power generating units at or near customer facilities to supply on-site energy needs. CHP enhances the advantages of DG by the simultaneous production of useful thermal and power output, thereby increasing the overall efficiency. CHP offers energy and environmental benefits over electric-only and thermal-only systems in both central and distributed power generation applications. CHP systems have the potential for a wide range of applications and the higher efficiencies result in lower emissions than separate heat and power generation systems.

Proton exchange membrane fuel cells (PEMFCs) are highly efficient power generators, achieving up to 50-60% conversion efficiency, even at very small sizes. When combined to generate both heat and electricity, PEMFCs can reach over 80% efficiency, suggesting that CHP typically requires only ¾ of the primary energy separate heat and power systems require. This reduced primary fuel consumption is key to the environmental benefits of CHP, since burning the same fuel more efficiently means fewer emissions for the same level of output.

For typical North America residential buildings the hot water demand is seen to be smaller than the electricity demand and also fairly well correlated (temporally) with it. Waste heat from the stack appears to be well matched with the hot water demand, both in terms of magnitude and temperature. In this case, the cogeneration system typically includes a PEM fuel cell system for generating electric power and heat by reacting fuel gas with an oxidant gas, a cooling water circulating path for circulating cooling water in order to recover heat generated by the fuel cell system, a storage tank for reserving hot water to be supplied to an external hot-water supply load, and a heat exchanger for transferring heat recovered by the cooling water to water in the storage tank. Such a typical cogeneration system has been disclosed in U.S. Pat. No. 6,420,060 to Yamamoto et al. (Matsushita Electric Industrials Co.), and in JP 20022280031 to Shin et al. (Osaka Gas Co. Ltd.). Cogeneration systems of this kind usually have heat to electricity ratios of about 0.8-1.0.

JP 2003217603 to Osamu et al. (Toyota Motor Corp.) and U.S. Pat. Application No. 2002146605 to Osamu et al (AISIN SEIKI) disclose fuel cell cogeneration systems for supplying power and hot water in which an off gas combustor burns the off gas from a fuel cell anode, a first heat exchanger installed downstream a stack cooling part recovers combustion heat of the off gas as warm water, and a passage feeds the off gas residual after combustion in the off gas combustor to a reformer combustion burner. This type of cogeneration system is also often seen when an autothermal reformer is integrated with a PEM fuel cell system, such as disclosed in U.S. Pat. Application Nos. 2003064264, 2003008184 and 200218246, which usually provide thermal energy more than twice the electricity (heat to electricity ratio greater than 2). Cogeneration systems of this kind can be suitable for buildings in some European countries, in which the demand for thermal energy exceeds that for electricity.

The thermal energy recovered from a fuel cell system is sometimes insufficient in terms of hot water quantity or temperature. It is common that the space heating and electric loads are anti-correlated, with space heating demand being largest in winter when the average electric load is smallest, and vice versa. In warm weather, space heating is often not needed, and the heat generated in electricity production can be more than sufficient to heat domestic water. In cold weather, on the other hand, the heat demands of space heating and hot water can exceed the supply of energy available from the fuel cell stack plus the fuel processor assembly. There are also applications in which thermal energy demand varies largely in terms of the heat to electricity ratio, ranging between 0.5 to 2.0 or greater. For all these situations, the two typical cogeneration systems discussed above are not suitable. U.S. Pat. No. 6,290,142 to Togawa et al. (Honda Motors) discloses a cogeneration apparatus arranged to properly respond to a plurality of separate demands for supplying the thermal energy. A hot water storage tank is provided for storing a first hot water supply produced using waste heat from a fuel cell. Depending on the hot water demand, it is directly drawn from the hot water tank, while a re-heating boiler is provided for heating a second hot water supply to be provided to the thermal load of space heating.

To prevent a shortage of hot water and/or insufficient temperature and to improve the system efficiency, JP 2002289212 to Teruya and Shigetoshi (Toshiba Corp.) discloses a fuel cell cogeneration system that uses a first heat exchange device for recovering waste heat of a fuel cell and a second heat exchange device for accumulating and receiving heat from the sun, and is structured so as to store the water heated by the first and second heat exchange devices in a heat storage unit. More heat can be obtained and more water can be heated with respect to a system in which only the first device is used. Since the second device uses natural energy, supplemental heating by electric power or gas can be reduced or eliminated, so that system efficiency can be improved.

When anode off gas is recycled to the reformer burner, there are situations in which the reformer can get overheated if the fuel utilization of the fuel cell stack is lower than a specific value (e.g. <50-65%), though such low fuel utilization is often unavoidable in situations such as start up and load changes. To prevent the reformer from overheating, JP2002042840 to Hiroki and JP 2003217603 to Osamu et al. discloses a fuel cell cogeneration system with a mechanism feeding the anode off gas of the fuel cell to both a reformer combustor and an auxiliary cogeneration water-heating burner. A gas flow meter detecting the anode off gas flow rate is provided in an anode gas outlet of the fuel cell.

U.S. Pat. No. 6,861,169 to Michael et al. discloses a cogeneration system in which one of the embodiments proposes the use of an optional furnace, to provide heat for at least one of space heating and potable water heating. There may also be a controller for providing sufficient heat for at least one of space heating and potable water heating by selectively activating at least one of the additional furnaces and the burner in the fuel cell and fuel processor assembly. The additional furnace may also optionally be used to provide supplemental heat to the third fluid loop for use in one or more of space heating, potable water heating, and provision of startup heating to the cogeneration system.

U.S. Pat. No. 5,335,628 to Dunbar discloses a fuel cell and a boiler coupled in such a manner that the water used to capture excess heat generated by the fuel cell is used for boiler feed water heating. In one embodiment, steam generated by the boiler is used in an operation that converts the steam to condensate, and the liquid is returned to the fuel cell for use as a heat sink for thermal energy generated within the fuel cell unit.

Obviously, there is a need to provide an efficient and effective combined heat and power (CHP) or cogeneration system. In particular, it is needed to provide a CHP system that can be operated in a simple manner to produce both thermal and electric energies, and have the heat to electricity ratio in a wide range, say from 0 to more than 2, to be applicable for a wide practical applications characterized by different demands of hot water, space heating and electric power.

SUMMARY OF THE INVENTION

The present invention provides a combined heat and power system to be developed in one single and simple product platform suitable for a plurality of seasonal and geographic conditions having variable characteristics of thermal and electric power demands.

The present system generates heat and electricity at any desirable ratio without adding additional furnaces or boilers and associated components and controls. Furthermore, the present invention allows adopting a single product platform that can be marketed to satisfy different demands of thermal and electric energy.

According to one embodiment of the invention, there is provided a combined heat and power system with separate process modules. The combined heat and power system has a first module, a fuel processor module, to produce a hydrogen-rich reformate from a hydrocarbon fuel such as natural gas, propane, or liquefied petroleum gas (LPG). There is a second module, a fuel cell power module, for generating electricity from the hydrogen-rich reformate. There is a third module, a heat recovery system, for removing heat from at least one of the fuel processor and fuel cell power modules for use in a cogeneration application such as space heating and/or water heating.

According to another aspect of the invention, there is provided a cogeneration system having a fuel cell stack for generating electricity from a hydrogen-rich reformate and a fuel cell coolant circuit for cooling the fuel cell stack. The fuel cell coolant can be in heat exchange with a cogeneration fluid, normally water, to recover the heat generated by the fuel cell stack and store the recovered heat to a storage tank, or used directly. The heat recovery from this heat exchange allows a heat to electricity ratio of approximately 0.8 to 1.0 to be achieved According to another aspect of the invention, there is provided a cogeneration system having a fuel cell stack cooling loop including at least a first heat exchange unit for transferring heat to a cogeneration fluid, and a second heat exchange unit for dissipating heat into the environment. The installation of the second heat exchange unit allows the CHP system to provide a heat to electricity ratio as low as 0, in the case in which the thermal demand is non-existent.

According to yet another aspect of the invention, there is provided a cogeneration system with a fuel processor module. The fuel processor module has a burner for burning a fuel to supply energy for steam reforming reaction to produce a hydrogen-rich reformate and a fuel processor exhaust, which can be used in a CHP application to improve CHP system efficiency.

It is still another aspect of the invention to provide a cogeneration system utilizing the burner of a fuel processor to supply supplemental thermal energy for hot water generation and/or space heating. Unlike the previous designs in the art where an additional burner or furnace is added for this purpose, the present invention achieves it without addition of the additional burner or furnace and the associated components and controls.

It is yet another aspect of the invention to provide a cogeneration system having flexible and controllable cogeneration loops. There is a first cogeneration loop to recover heat from a fuel cell power module, thereby producing a heat to electricity ratio between 0 and approximately 1.0. There is a second cogeneration loop to produce supplemental thermal energy for hot water generation and/or space heating. This loop can be connected or disconnected via switching valves depending on the thermal demands of hot water and/or space heating. This loop can also be useful to control the fuel processor temperature to prevent it from being overheated in cases when the fuel cell has low fuel utilization efficiency. With this second loop, it becomes possible to adjust the heat to electricity ratio at any desirable levels such as more than 2. It is also possible to produce the hot water at a higher temperature or superheated steam, which would have been difficult if only the first loop is used.

BRIEF DESCRIPTION OF THE DRAWINGS

These and other features, aspects and advantages of the present invention will become better understood with regard to the following description and accompanying drawings wherein.

DETAILED DESCRIPTION OF THE PREFERRED EMBODIMENT

Figure 1:
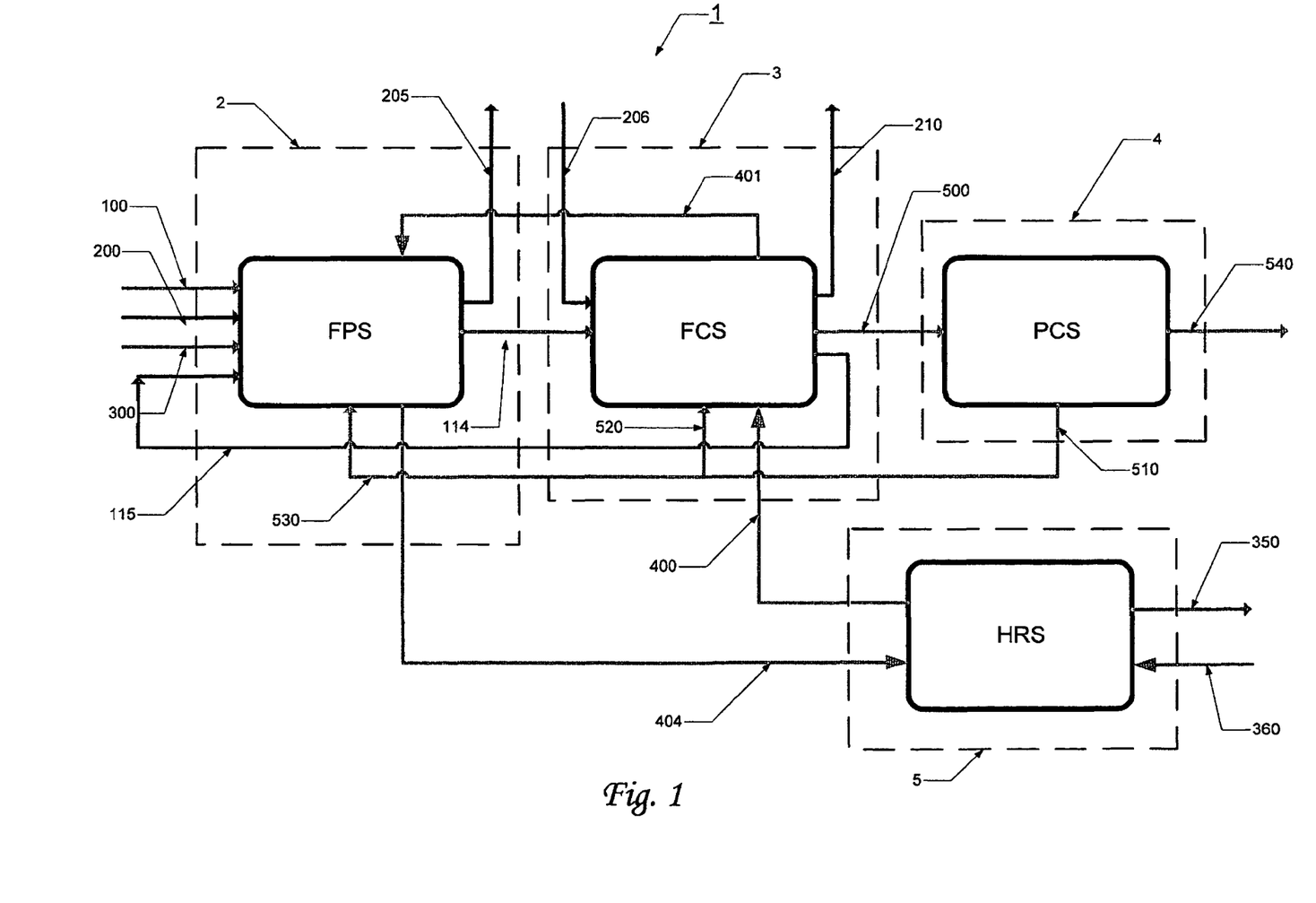
FIG. 1 is a block diagram of a fuel cell combined heat and power generation system, according to the present invention.

Referring first to FIG. 1, there is shown an exemplary hydrocarbon fuelled PEM fuel cell system 10 for producing heat and electric power according to the present invention. The combined heat and power generation system 10 includes: a fuel processing module (FPS) 2 to produce a hydrogen-rich reformate from hydrocarbon fuel; a fuel cell power generation module (FCS) 3 to produce power and heat; and a heat recovery, or cogeneration, module (HRS) 5 to recover heat produced by the fuel cell power generation module 3 and/or fuel processing module 2 for providing domestic hot water and/or space heating.

In the exemplary embodiment, an optional power conversion and conditioning module (PCS) 4 to convert the electricity produced into utility grade electricity is also shown.

In the embodiment of FIG. 1, the modules shown can be independent devices, manufactured independently and marketed as a fuel processor for hydrogen production, a fuel cell power generator run with pure hydrogen as backup power, and, when combined in a proper way such as shown in FIG. 1, as an integrated fossil fuel fuel cell power system for either small or large stationary applications to produce both heat and power for users.

For the fuel processing module, FPS 2, there is a fuel stream 100 supplying the fuel (e.g. natural gas, liquefied petroleum gas), a water stream 300 for use in hydrocarbon reforming and an air stream 200 supplying the air for combustion and possibly for a preferential oxidation reactor to clean up carbon monoxide contained in the reformate. There is another stream, anode off gas recycling stream 115, which supplies the majority of the burning fuel for the fuel processor in the case in which the fuel processor is a part of the fuel cell power system. In the case of a stand-alone, this stream will be compensated by a separate burning fuel stream, which is generally the same as the fuel (split from fuel stream 100 inside FPS) supplied to the reformer.

When the power conversion and conditioning module (PCS) 4 is present, a small portion of the electric power 510 produced by the fuel cells is used to operate the electronics and controllers of FPS 2 and PCS 4. The remaining electric power 540 is output as utility grade electricity for customer use.

To co-generate thermal energy for hot water generation and/or space heating, a heat recovery module 5 is integrated. Coming from the HRS 5, the cogeneration fluid stream 400 flows first to the FCS 3 to recover the heat produced by the electrochemical reaction in the fuel cells. The warmed cogeneration fluid 401 coming out of the FCS 3 enters FPS 2 to be further heated by recovering the waste heat from the combustion of the flue gas exhausting from the fuel processor 2 and/or by being heated through the fuel processor. This will ensure that the hot water generated is sufficiently hot (e.g. >65° C.) and has a sufficient flow rate.

Figure 2:
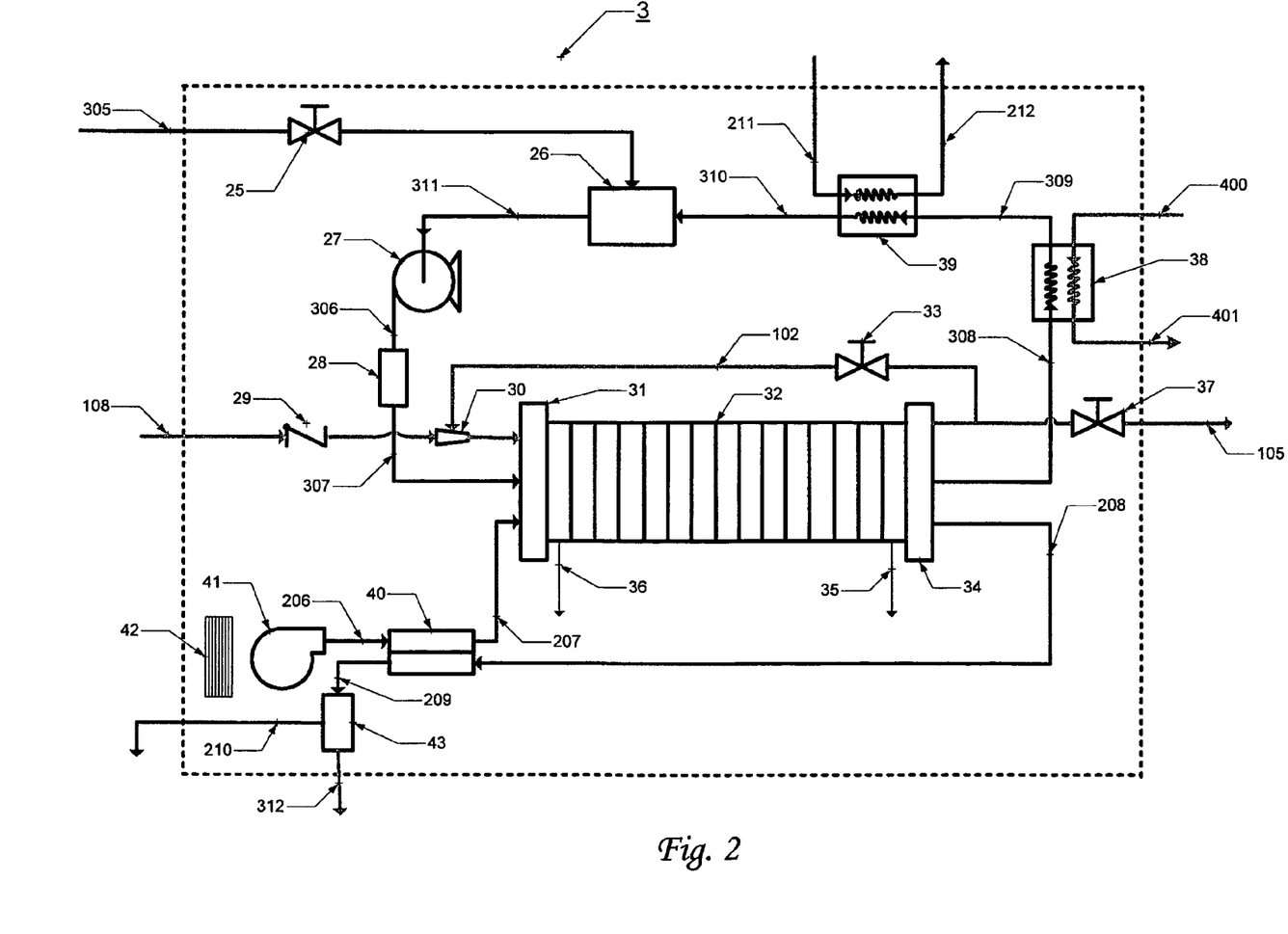
FIG. 2 is a block diagram of a fuel cell power generation module of the system of FIG. 1, according to the present invention.

With respect to FIG. 2, there is illustrated an exemplary embodiment of a fuel cell power generation module 3. The module 3 generally comprises a fuel cell stack 32, which in turn comprises a plurality of fuel cells connected in series in an electrical circuit through current collectors. The plurality of fuel cells are pressed and housed between two end plates 31 and 34, on which there are ports and connectors for inputting and outputting fluid streams. The hydrogen rich reformate is directed from an upstream fuel processor, which will be illustrated in FIG. 3, to the fuel cell stack 32 via an optional check valve 29 and a suction-type mixer (or ejector) 30, which is optional when the anode off gas recycling to the fuel cell stack entrance is needed, as is the case for pure hydrogen operation. A part of the hydrogen containing fuel exiting the fuel cell stack 32 may be recycled to the fuel cell stack entrance, and the remainder 105 exhausts through a valve 37 and recycles back to the fuel processor module, where it is burnt to supply heat for reforming reactions.

There is also shown an air stream, which is generally taken by an air compressor or blower 41 via an air filter 42. The air stream 206 is humidified through a humidifier 40, which is in humid exchange with generally saturated cathode exhaust air. The humidified air stream 207 enters the fuel cell stack 32, and flows out of it as cathode exhaust air 208. The cathode exhaust air 209, after passing through the humidifier 40, may enter a water separator 43 or simply a drain valve to remove any condensed water 312 thereof, before being vented.

Still with respect to FIG. 2, there is shown a fluid loop for controlling the temperature of the fuel cell stack 32. In this fluid loop, fluid 311 is pumped from a storage tank 26, which also serves as a fluid baffle and a receiver of additional fresh fluid 305 during the operation. The fluid, or the fuel cell coolant, also called the stack coolant, is typically, but is not limited to, deionized water or another dielectric fluid, and may include antifreeze mixtures or other components to minimize corrosion. The pressurized coolant 306 may enter a coolant purification unit (a filter, a de-ionizer, or any other type of coolant treatment devices) 28 to remove any dust or particle or chemical impurities before being brought into the fuel cell stack 32. The stack coolant then removes heat generated in the stack 32 by the reaction of the hydrogen and oxygen. This heat represents a substantial fraction of the recoverable low temperature heat generated by the FCS 3. The stack coolant, after leaving the stack 32 (which typically operates at about 65-85° C. in this example) at about 0 to 5° C. lower than the stack temperature, enters a cogeneration heat exchange unit 38, where it transfers heat to a "cogeneration fluid".

The cogeneration fluid may be water, an antifreeze mixture, or otherwise as required by the heating system of the building. The stack coolant leaves the cogeneration heat exchanger at a preferred temperature, e.g. about 3-10° C. lower than the stack temperature, while the cogeneration fluid 401 is left at a temperature of typically 60° C. or higher. The stack coolant exhausting from cogeneration heat exchange unit 38 now enters a heat exchange unit 39, which could be an air cooled heat exchange unit or radiator equipped with a fan. The heat exchange unit 39 is installed, as a guarantor of temperature control, to remove any excess heat from the stack coolant to ensure a proper coolant temperature at the stack inlet 31. The heat exchange unit 39 is useful in situations of heat rejection when thermal demand is lower than the heat available from the fuel cell stack. Additionally, it is useful for cooling the stack, even when there is no cogeneration at all. The installation of the heat exchange unit 39 allows to obtain heat to electricity ratios from 0 (when there is no cogeneration fluid flow and the fan is in full capacity) to approximately 1.0 (when there is sufficient cogeneration fluid flow and the fan is in idle). In an alternative embodiment, the stack coolant can partly or entirely bypass the heat exchange unit 39 in order to minimize heat loss when thermal demand is high.

The embodiment of FIG. 2 has several advantages. First, it increases the modularity of the system, which in turn increases the flexibility of manufacturing and operation, by the fact that the fuel cell power module 3 can be an independent power generator, and can be part of a combined heat and power system. Secondly, the portions of the system required for cogeneration are exterior to the FCS 3, and thus more accessible for repair or service. Thirdly, the system has the ability to achieve heat to electricity ratios between 0 and approximately 1.0.

Figure 3:
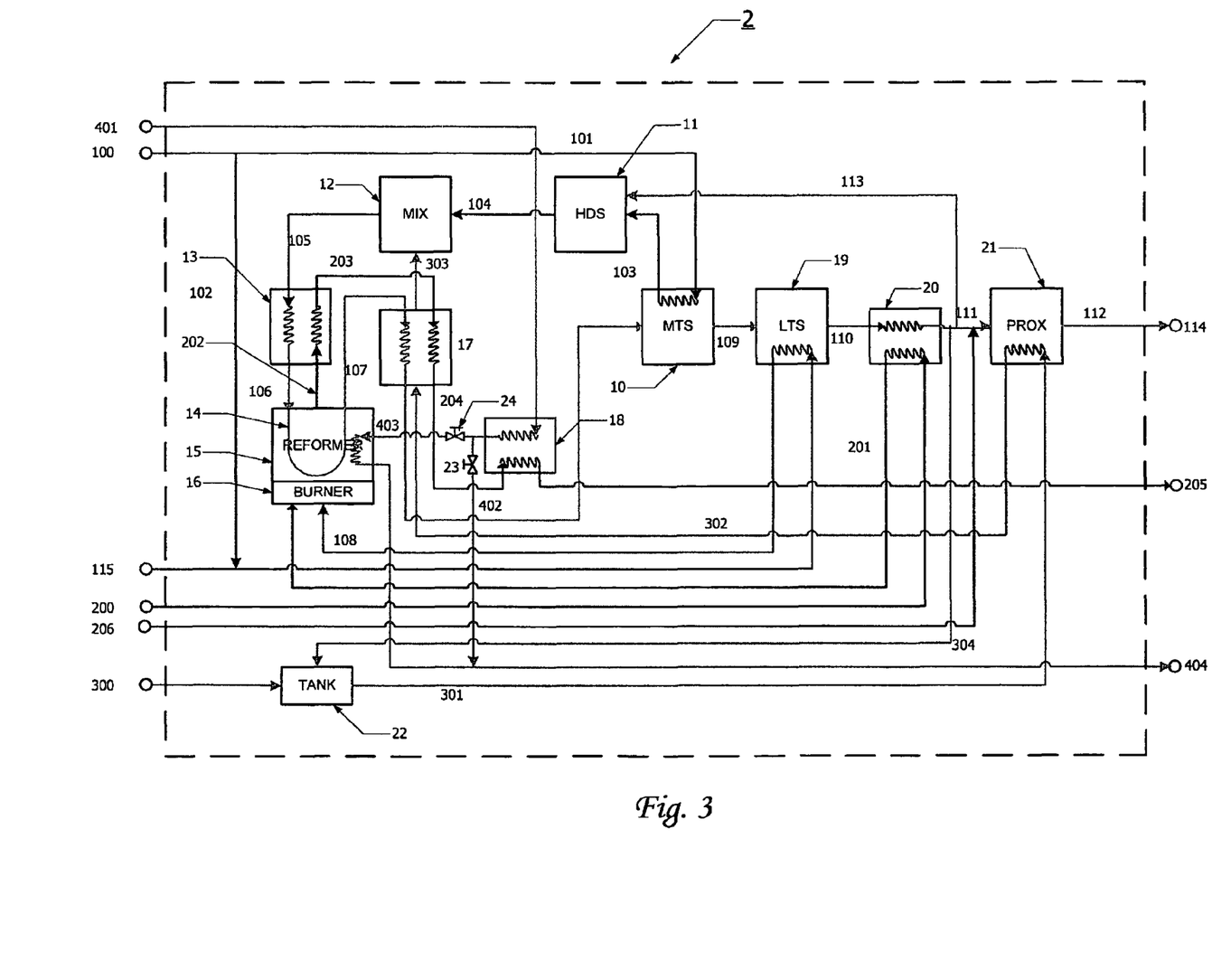
FIG. 3 is a block diagram of a fuel processing module of the system of FIG. 1, according to the present invention.

Now referring to FIG. 3 for fuel processing module 2. The fuel processing module 2 converts a raw hydrocarbon fuel stream into a hydrogen-rich, substantially CO-free reformate stream for use in fuel cells. There are generally six fluid streams, namely, (1) a fuel stream starting with raw hydrocarbon fuel 100 and ending with a hydrogen rich reformate 114, (2) a recycled anode off gas stream 115, which is then burnt at burner 16, (3) an air stream 200 supplied to burner 16, (4) an air stream 206 supplied to a preferential oxidation reactor (PROX) 21, (5) a water stream 301 supplied to produce steam 303 for reforming reactions, and (6) a cogeneration fluid 401 from the fuel cell power module 3 and going to the heat recovery module 5.

In the embodiment shown in FIG. 3, the raw fuel stream 100 may be natural gas or LPG or any other hydrocarbon fuel. In case liquid hydrocarbon fuels are used, a vaporization mechanism can be added. The fuel stream enters the fuel processing module 2 through a conduit after passing accessories such as a compressor, hand valve(s), solenoid valve(s) and a filter, which are not illustrated. The pressurized fuel stream, at approximately 1-10 psig and 100° F., is directed to a heat exchanger integrated with a medium temperature shift (MTS) reactor 10 to be preheated to about 300-500° F. that is suitable for the subsequent hydrodesulfurizer (HDS) 11. The preheated feed stream is mixed with a small amount of hydrogen-rich stream 113 recycled through a conduit connecting the exit of heat exchanger 20. There may be a compressor installed on the conduit to drive the low-pressure hydrogen-rich gas to high-pressure HDS. There may be also other alternative means for this purpose, such as an orifice, or an ejector. The mixed feed/hydrogen stream is then directed into the HDS 11, where a suitable hydrodesulphurization catalyst and an absorbent (e.g. zinc oxide) or a hydrodesulphurization agent containing both catalyst and absorbent is packed. In the HDS 11, the sulphur components are converted to hydrogen sulfide by reacting with hydrogen in the presence of catalysts, and the hydrogen sulfide is subsequently reacted with zinc oxide to form solid zinc sulfide and water. The HDS is preferably operated at temperatures of 300-500° F., and hydrogen concentration should be maintained in the mixed stream at about 0.5-2%. The desulfurized feed stream exiting the HDS 11 is then mixed with superheated steam 303 at mixer 12. The feed/steam mixture exiting mixer 12 with a temperature of approximately 600-800° F. enters into a heat exchanger 13 in which it is preheated up to 1000-1200° F. by exchanging heat from the combustion flue gas exiting the combustion chamber 15. The preheated feed/steam mixture is directed into reformer reactor tubes 14, which can be interconnected in parallel and/or series to ensure sufficient residence time for achieving expected conversion.

The reformer tubes 14 are immersed in or adjacent to the combustion chamber 15 to receive the heat energy (dominantly by radiation) required for the endothermic steam reforming reactions. The steam reformer 14 operates at approximately 1100-1300° F., while the temperature at the location near the reformer outlet in the combustion chamber is 1200-1600° F. A burner 16 is specially designed to be operable with a mixture of raw hydrocarbon fuel and hydrogen of 0-100%. The reformate, consisting of about 55% H2, 9% CO, 7.5% $CO_2$, 0.7% $CH_4$, and 28% $H_2O$ if natural gas is reformed at 1300° F. and S/C (steam-to-carbon ratio) of 3.0, is directed into a steam boiler 17, together with flue gas, to provide heat for steam generation and superheating. This steam boiler is featured by its ability to generate superheated steam quickly in a flash-like fashion. Unlike conventional designs in the art in which slow steam generation limits the load following and ramp up capabilities of the fuel processor, the flash-like steam generation makes the fuel processor capable of responding quickly to variations in load demand, and to accelerate the ramp up speed. In both transient processes, the quick steam generation guarantees the fuel processor will operate at any moment with high enough S/C in order to prevent carbon deposition and CO spiking. The reformate exiting the boiler 17 has a temperature of 450-500° F., and is sent to the MTS reactor 10 that operates at approximately 450-550° F. to reduce the carbon monoxide to approximately 0.5-1.0%. As described above, the heat generated by the exothermic shift reaction in the MTS is removed by a heat exchange unit 10 to preheat the hydrocarbon fuel. Exiting the MTS, the reformate, which now contains about 0.9-1% CO, is sent to a low temperature shift (LTS) reactor 19 that operates at approximately 300-400° F. to reduce the CO to typically around 0.1-0.5%. The heat generated in the LTS is removed by providing a heat exchange unit to preheat the hydrogen-containing recycled anode off gas 115 from fuel cells. The reformate stream exiting the LTS at about 350° F. sometimes needs to be cooled before it can be directed into the PROX 21. To accomplish this, a heat exchange unit 20 is provided by which the reformate stream 110 is cooled to about 160-170° F. by transferring the heat to preheat combustion air stream. The combustion air 201, preheated up to 300-330° F., is then directed into the burner 16, from where the combustion flue gas exits at about 1200-1600° F. before being directed into the heat exchange unit to preheat the feed/steam mixture.

The reformate 111 exiting the heat exchanger 20 flows through a conduit on which there may be provided a means for collecting the water condensate 304 to return to a water tank 22. After which, a small amount of the reformate 113 is recycled back to upstream HDS 11 for hydrodesulphurization. The remainder of the reformate stream is then mixed with an air stream 206 before being directed into the PROX 21 where most of the CO remaining in the reformate stream is oxidized into $CO_2$, together with a small amount of hydrogen also converted to $H_2O$. The CO concentration in the reformate stream 112 exiting the PROX 21 is less than 10 ppm, preferably less than 1-2 ppm. The heat released by oxidation reactions of CO and $H_2$ in the PROX 21 is removed by providing a heat exchanger to preheat the feed water 301 to boiler. The water stream 302 exiting the PROX at about 130° F. is sent to the boiler 17 where it evaporates and is superheated up to 800-1000° F. The water supply rate, or the steam generation rate, is controlled and adjusted by a variable speed water pump (not shown). The superheated steam 303 exiting the steam boiler 17 is then mixed with the desulfurized feed stream 104 in a mixer 12. The flue gas stream 203 exiting the heat exchanger 13 at about 1000-1150° F. flows into the steam boiler 17 and exits from it at about 450-550° F. Although not shown, there are filters on the exits of the steam reformer, MTS, LTS, PROX and HDS to remove the entrained catalysts from the streams. There are also some accessories such as air blowers, water pumps, valves, pressure regulators and so on, which will not be shown herein.

The anode off gas recycled from the fuel cells may not be enough to provide the desired reformer temperature if the fuel cells have high hydrogen utilization. In this case, a supplementary fuel stream 102 is provided, either continuously or intermittently. The burner is designed to be operable with a mixture of hydrocarbon fuel and hydrogen of 0-100%.

According to the present invention, the extra thermal energy is transferred to the cogeneration fluid 403 by opening the valve 24 to prevent the reformer from overheating. The heat transfer can be accomplished by a heat exchanger installed inside, or adjacent to, the combustor-reformer assembly. In addition to increasing fuel cell system operation flexibility, it also increases the total system efficiency.

To maximize heat recovery, a cogeneration fluid stream, which comes from the fuel cell power module 3, is first directed into a heat exchanger 18, where the cogeneration fluid is heated by the heat being transferred from the flue gas stream. The flue gas exiting the heat exchanger 18 can be designed to have a temperature as low (e.g. 70-150° F.) as desired. Exiting the heat exchanger 18, the cogeneration fluid can be either partially or entirely directed through operating valves 23 and 24. In the case that heat recovered from the fuel cell module 3 and heat exchanger 18 is enough in terms of temperature and quantity to meet the thermal demand of hot water production and/or space heating, the cogeneration fluid will entirely go though valve 23 (while valve 24 is closed) back to the HRS 5. In the case that heat recovered from the fuel cell module 3 and heat exchanger 18 is not enough in terms of temperature and quantity to meet the thermal demand of hot water production and/or space heating, and that the fuel processor 15 is being overheated due to excess fuel from anode off gas recycling as described earlier, the cogeneration fluid will pass valve 24 to a heat exchanger inside the fuel processor. The heat exchanger inside the fuel processor 14 can be designed as immersed tubes or shell type, and can produce either hot water (e.g. >60 deg. C.) or even steam according to the requirements.

By providing the optimized thermal and flow integration, the fuel processor described in the present invention has been performed efficiently and reliably. The produced hydrogen rich gas contains substantially low CO (<10 ppm), protecting the fuel cell stack from CO poisoning. The fuel processing efficiency defined by the HHV (higher heating value) of produced hydrogen in stream 114 divided by the HHV of total fuel input reaches about 80-82%.

Moreover, the fuel processor as described above ensures an essentially high turndown ratio, which is generally limited in prior arts by the amount of anode off gas recycling. At low fuel utilization efficiency, the amount of anode off gas increases, and the reformer 14 will be overheated, even though the additional fuel stream 102 is completely turned off. With the present invention, in this case, the extra heat will be removed from the heat exchange unit of the reformer 14 by flowing the cogeneration fluid 403. At high fuel utilization efficiency, the amount of anode off gas decreases, and may be not enough to supply the necessary heat for reforming reactions. In this case, the additional fuel stream 102 will be turned on, operated either continuously modulated or simply on/off, to supply the required supplement.

Furthermore, the fuel processor as described above, allows to provide an adjustable heat to electricity ratio that can be any desired value. It should be understood that this feature is achieved without adding another furnace or burner, insider or outside the system. The thermal demand can be matched by several control strategies including varying the cogeneration fluid rate and by modulating the rate of stream. To ensure the appropriate temperature for reforming reactions, a thermocouple could be installed inside the combustion chamber at an appropriate location, or inside the reformer tube outlet. This temperature signal will be used to control the supply of the supplement fuel, which is expected to increase when heat transfer to cogeneration fluid occurs.

Figure 4:
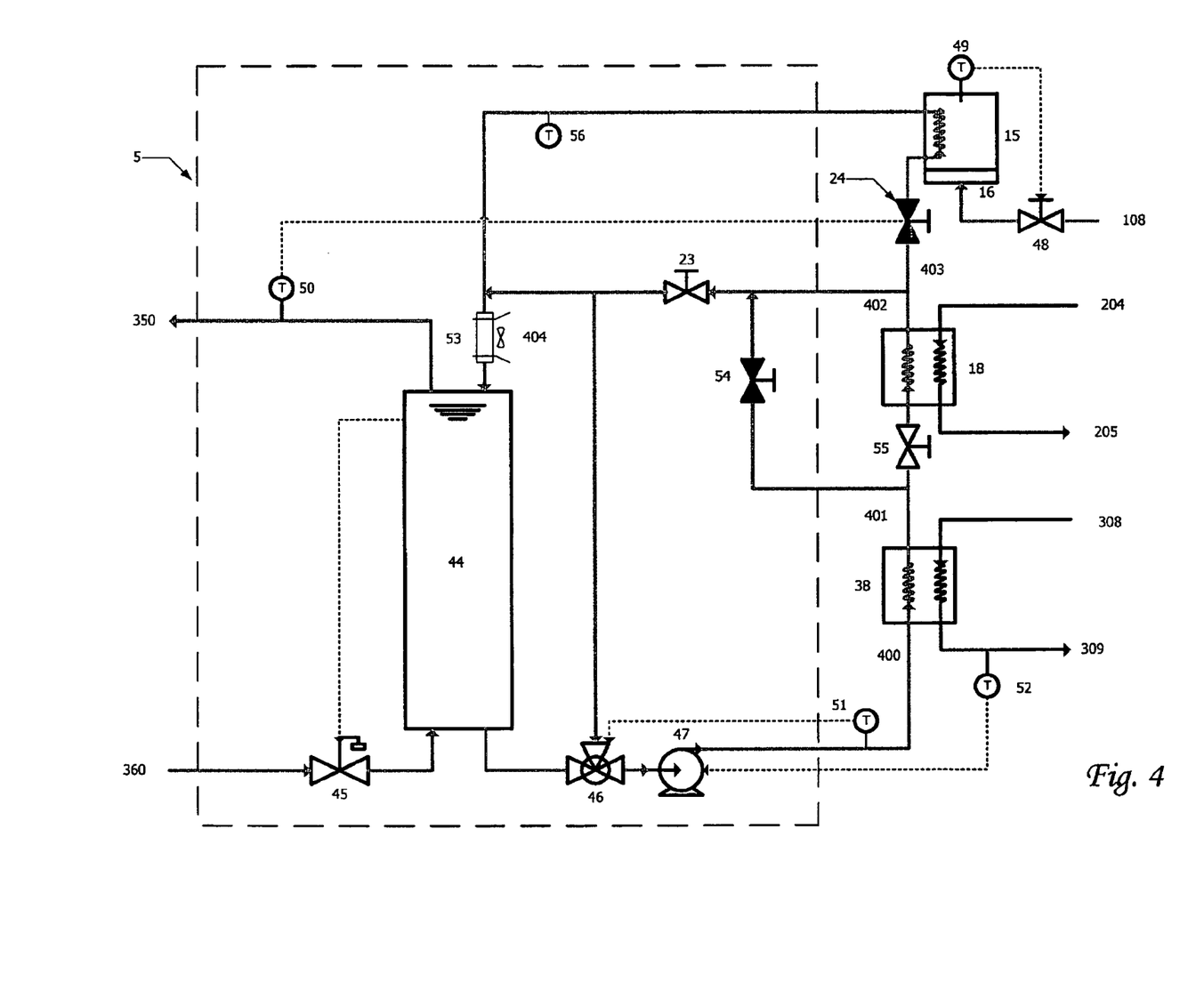
FIG. 4 is a block diagram of a heat recovery module of the system of FIG. 1, according to the present invention.

Referring now to FIG. 4, there is illustrated an exemplary embodiment of a heat recovery module 5. A storage tank 44 stores hot water. Hot water stored can be utilized by a hot-water supply load 350. The cogeneration fluid, as mentioned above, could be water or any other heat transfer fluid. In case of thermal fluid used, there will be a heat exchange unit (not shown) immersed inside the storage tank 44 preferably in the upper location. Designs will ensure a decreasing temperature gradient from upper layer toward bottom, where the cooler cogeneration fluid 360 will be pumped into the cogeneration loop. The water level inside the tank 44 may be preferably controlled by a level switch (indicated by a signal of dashed line), or a float valve, which would send signals to valve 45 to close or open the city water supply.

Figure 5:
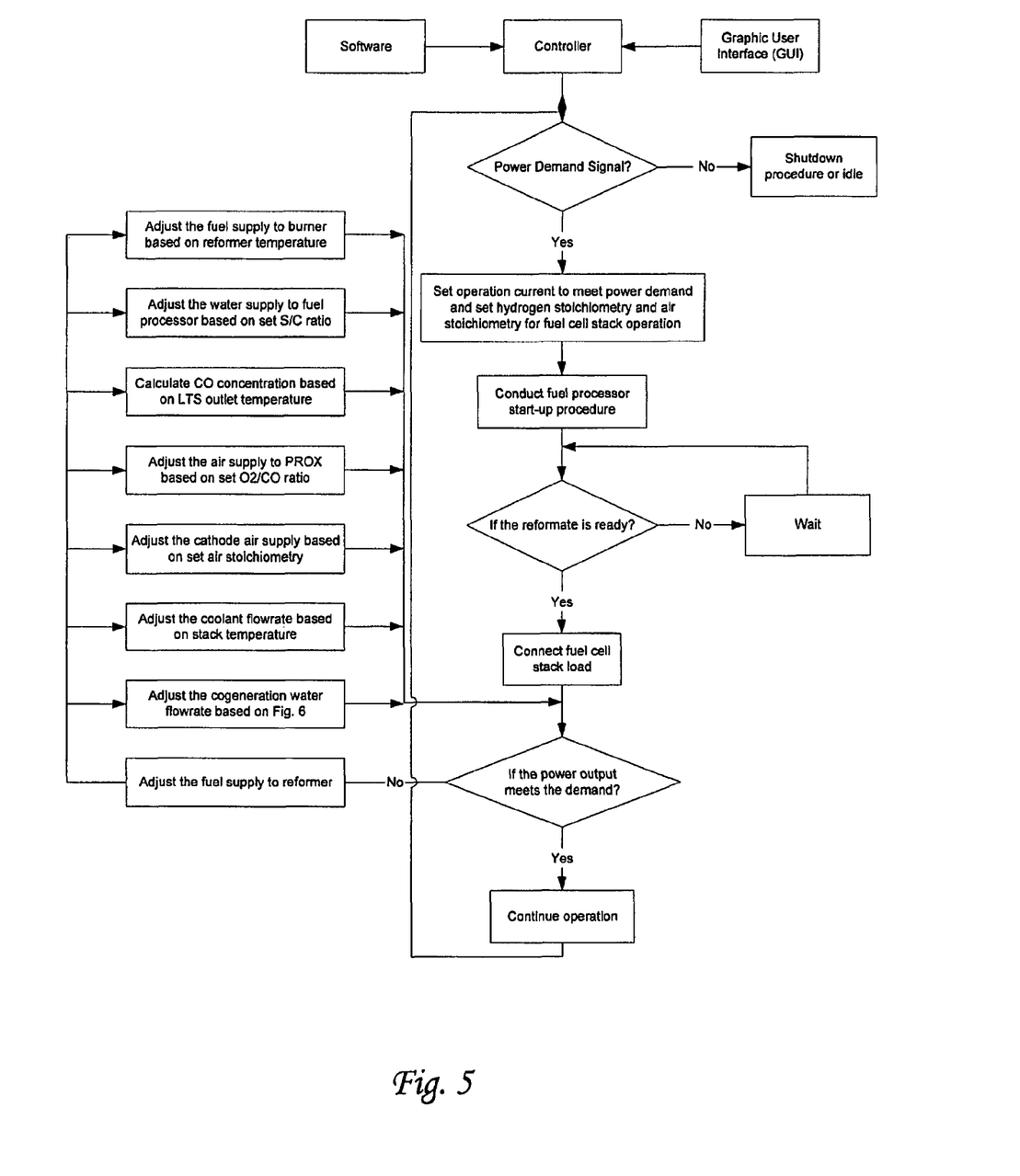
FIG. 5 is a flow chart illustrating an exemplary method to control the operation of the disclosed CHP system.

FIG. 5 provides a flowchart illustrating an exemplary method to control the operation of disclosed CHP system. There is provided a controller which may comprise a set of necessary I/O boards for receiving and outputting analog and/or digital signals by electronically communicating with electronic devices such as compressors, pumps, solenoid valves, thermocouples, flowmeters, pressure sensors, hydrogen and hydrocarbon sensors or detectors. The control unit may also comprise a set of software programs and a graphic user interface (GUI) for data acquisition, analysis, display and other necessary control functionalities. When the system is in operation, but if there is no power demand signal being sent to the controller, the system will go into a shutdown procedure or remain at idle state. If the power demand signal constantly exists, the controller will set the system to operate at operating conditions such as hydrogen and air stoichiometry so that the power demand is met. Then the controller will initiate a fuel processor start up procedure to generate a hydrogen-rich stream at the required rate as determined before. As soon as the controller ensures the hydrogen stream is ready at its preferred rate and quality (temperature, $H_2$ and CO concentrations, for instance) the fuel cell stack will be electronically connected to the load. Otherwise the controller will wait until the hydrogen stream is ready. After the load is connected, the controller will check if the power produced by the system meets the power demand, if yes then continue operation. Otherwise the controller will adjust the hydrocarbon fuel supply to the reformer, which would be followed by all necessary adjustments to other system operation parameters, such as: (1) hydrocarbon fuel to burner based on reformer or burner temperature; (2) water supply to boiler based on set steam-to-carbon ratio and the newly set feed rate; (3) the air supply rate to PROX reactor based on set $O_2/CO$ ration and the CO concentration at PROX inlet determined based on LTS outlet temperature; (4) air stoichiometry; (5) coolant flow rate based on stack temperature requirement; and (6) the cogeneration fluid rate based on a schematic shown in FIG. 6. This process will be repeated till the power generation meets the power demand.

Figure 6:
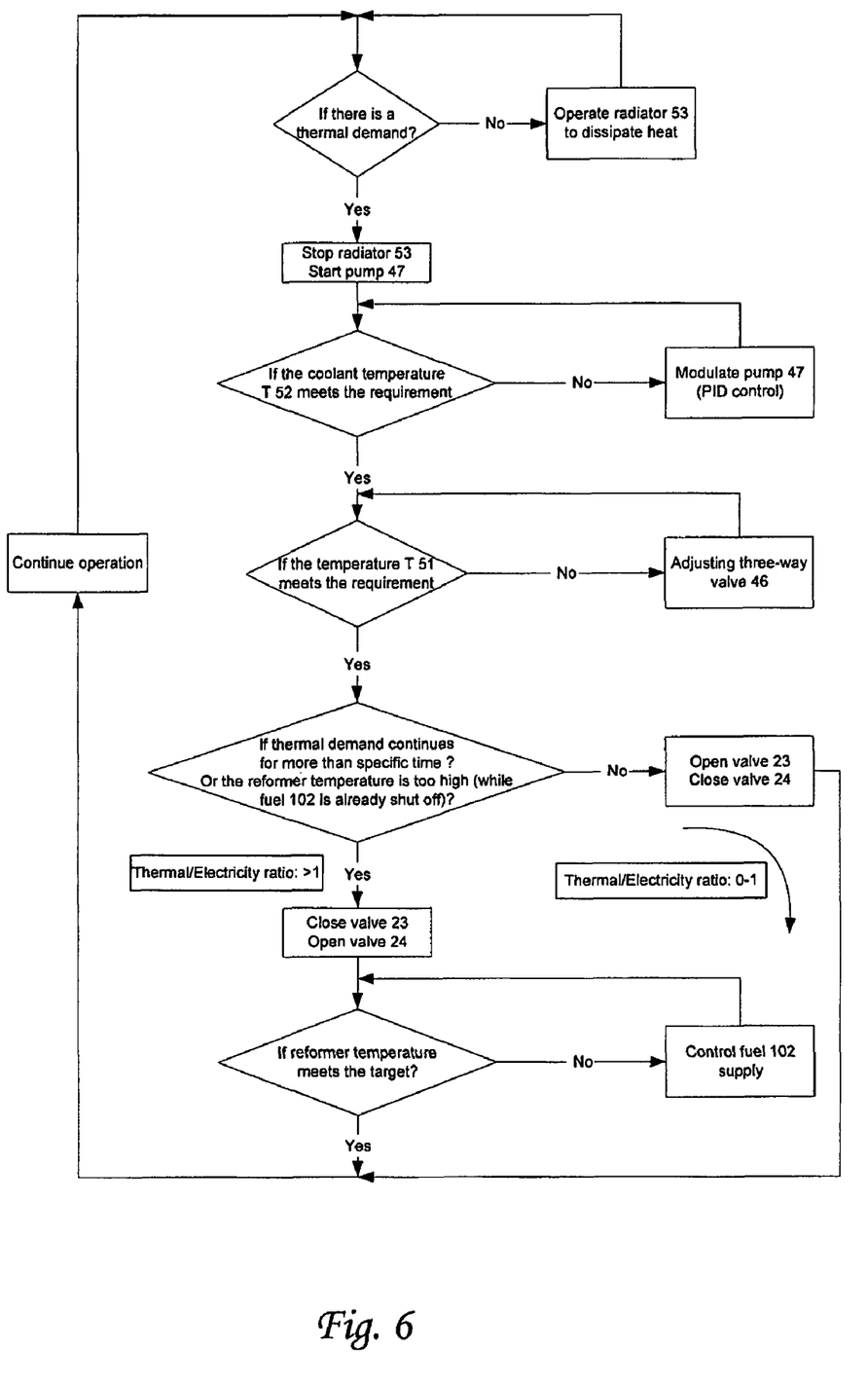
FIG. 6 is a flow chart illustrating the heat recovery process of the disclosed CHP system.

A thermal demand signal is sent to a controller unit for controlling the heat recovery operation in a process schematically illustrated in FIG. 6. The thermal demand signal can be the temperature or flowrate of the hot water stream 350. If there is no thermal demand, e.g. thermostat 50 constantly stays above a threshold temperature (e.g. 60-65° C.) and the flowrate of stream 350 is zero suggesting the hot water storage tank is thermally saturated, the radiator 53 will be activated to dissipate all heat recovered from the fuel cell system. However, if there is a thermal demand, the radiator 53 will remain inactive.

The cogeneration fluid flow rate is adjusted by means of a three way valve 46. The three way valve 46 has an inlet from the tank 44 from which cool cogeneration fluid is received and an inlet receiving hot cogeneration fluid after it has passed through the heat recovery loop. The three way valve 46 can be controlled by a thermistor 51, which is generally set with a threshold of 5-40° C. As far as the fuel cell operation is concerned, such a higher temperature is also necessary to avoid the stack coolant stream to be excessively cooled if the temperature of the cogeneration fluid at the cogeneration heat exchanger 38 inlet is too low. To achieve the right temperature of the cogeneration fluid, the cool cogeneration fluid coming from the storage tank 44 is mixed with the heated cogeneration fluid and the mix is provided to the pump 47.

In order to provide stack coolant at the stack inlet to have a temperature 3 to 10° C. lower than the fuel cell stack temperature after the heat exchanger 38, the speed of the cogeneration pump 47 is controlled, by means of a temperature signal sensed by thermistor 52.

The cogeneration fluid exiting the cogeneration heat exchange unit 38 can be either bypassed to the storage tank 44 through valve 54 (when the system is fuelled by direct hydrogen, for instance), or sent to fuel processor module 2 to recover extra heat (when the system is fuelled by hydrocarbon fuels). The valve 24 will stay open (the valve 23 will be closed) if there is a persistent thermal demand or if the reformer is being overheated due to high anode off gas recycling while the supplementary fuel 102 is already shut off. After exiting the reformer 14, the cogeneration fluid will optionally pass through a radiator 53 to reject some heat in the case in which the cogeneration fluid is passed through the reformer 14 only for preventing the reformer from being overheated, and the thermal energy is otherwise enough to meet the thermal demand. In the case of steam coming out of the fuel processor, it can either be used directly by any preferable means, or by a preferable means to condense the steam to release the heat to the tank and then return the liquid back to the loop.

A thermistor 50 detects a temperature of hot water supplied to building. When the hot-water load exceeds the hot-water supply of the system, the temperature of water detected by the thermistor 50 decreases gradually. The controlling unit issues a thermal demand signal to start cogeneration pump 47 while ensuring the radiator 53 being stopped.

With continuous withdraw of heat from the reformer 14, a thermistor inside the reformer 14 will detect the temperature of reformer 14 being lower than the predetermined value, and then the controlling unit will adjust the fuel supply 102. As a result, the desired heat to electricity ratio (greater than 1.0) can be achieved.

Figure 7:
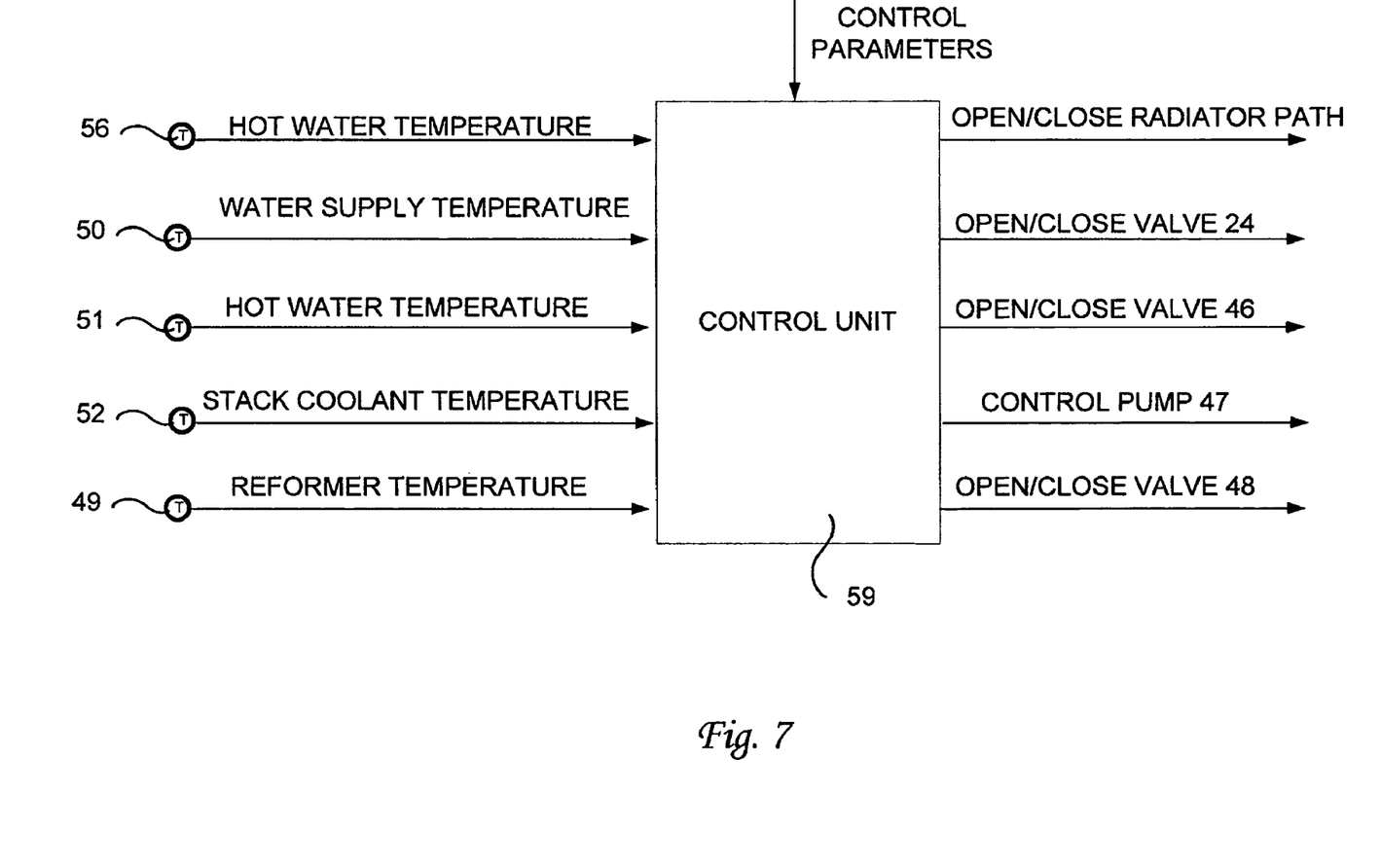
FIG. 7 is a block diagram of a controlling unit of the system of FIG. 1, according to the present invention.

With respect to FIG. 7, there is shown an exemplary controlling unit 59 according to the present invention. The controlling unit 59 receives as inputs temperature measurements from the various temperature sensors 49, 50, 51, 52, 56 deployed throughout the HRS module. The controlling unit 59 uses these temperature values and control parameters stored therein in order to determine the path of the cogeneration fluid through the cogeneration loop. This is achieved by the opening and closing of valves accordingly and thereby routing the cogeneration fluid through the appropriate modules, as well as controlling the intake of additional fuel to provide for the desired heat to electricity ratio.

The system of the present invention provides great modularity, optimized thermal and fluid management and system integration. The present invention provides combined heat and power generation with any desirable heat to electricity ratio, suitable for a wide range of applications covering different geographic markets. A wide range of heat to electricity ratio is achieved without adding extra furnace or burner and associated equipments and controls. Due to optimized thermal management and heat recovery, the CHP system according to the present invention is highly efficient.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A fuel cell system for combined heat and power generation, the system comprising:
    a fuel processor module for the production of a hydrogen-rich reformate from a hydrocarbon fuel;
    a fuel cell power generator module operatively connected to the fuel processor module for receiving said hydrogen-rich reformate to generate power;
    a heat recovery module thermally connected to said fuel processor module and said fuel cell power generator module;
    a valve system having a selectable configuration to provide at least two heat recovery paths for propagating a cogeneration fluid in the fuel cell system, at heat recovery path running from the heat recovery module to said fuel cell power generator module and back to said heat recovery module, and a second heat recovery path running from said heat recovery module to said fuel cell power generator module and said fuel processor module, and back to said heat recovery module; and
    a control unit operatively connected to the heat recovery module adapted to receive measurements indicative of thermal demand and to select the first heat recovery path when a heat to electricity ratio between 0 and about 1.0 is desired, and select the second heat recovery path when a heat to electricity ratio greater than 1.0 is desired.

2. A system as claimed in claim 1, wherein said fuel processor module comprises a heat exchange unit with a reformer-combustor assembly for recovering heat from fuel combustion taking place in said fuel processor module, according to said desired heat to electricity ratio.

3. A system as claimed in claim 1, wherein said fuel cell power generator module comprises a heat exchange unit for recovering heat from a stack coolant passing through said fuel cell power generator module, according to said desired heat to electricity ratio.

4. A system as claimed in claim 3, wherein said fuel cell power generator module comprises an air-cooled heat exchange unit or radiator to dissipate heat when there is no thermal demand.

5. A system, as claimed in claim 2, wherein said fuel processor module comprises a burner capable of burning a mixture of hydrocarbon fuel and hydrogen containing fuel cell anode off gas which provides additional heat to a heat exchange unit when said desired heat to electricity ratio is above unity.

6. A system, as claimed in claim 3, wherein said fuel processor module comprises a burner reformer which provides additional heat to a heat exchange unit when said desired heat to electricity ratio is above unity.

7. A system as claimed in claim 1, wherein
    said fuel processor module comprises a first heat exchange unit for recovering heat from flue gas combustion taking place in said fuel processor module;
    said fuel cell power generator module comprises a second heat exchange unit for recovering heat from a stack coolant passing through said fuel cell power generator module;
    said fuel processor module comprises a burner reformer which provides additional heat to a third heat exchange unit;
    and wherein said control unit controls said heat recovery module to recover heat from at least one of said first, second and third exchange units according to said desired heat to electricity ratio.

* * * * *